United States Patent [19]
Glover et al.

[11] Patent Number: 6,040,353
[45] Date of Patent: Mar. 21, 2000

[54] RADIATION CURABLE SILICONE COMPOSITIONS

[75] Inventors: Shedric Oneal Glover; Chi-long Lee; Wen-hong Tong, all of Midland, Mich.

[73] Assignee: Dow Corning Corporation, Midland, Mich.

[21] Appl. No.: 09/199,623

[22] Filed: Nov. 25, 1998

[51] Int. Cl.[7] ................................ C08F 2/50; C08J 3/28; C08L 83/07; C08L 83/06
[52] U.S. Cl. ................................ 522/15; 522/25; 522/79; 522/99; 522/172
[58] Field of Search ................................ 522/15, 25, 79, 522/99, 172

[56] References Cited

U.S. PATENT DOCUMENTS

| | | | |
|---|---|---|---|
| 4,617,238 | 10/1986 | Crivello | 428/452 |
| 4,640,967 | 2/1987 | Eckberg | 528/26 |
| 4,954,364 | 9/1990 | Stein et al. | 522/31 |
| 5,010,118 | 4/1991 | Desorcie et al. | 522/31 |
| 5,147,946 | 9/1992 | Liu | 525/479 |
| 5,270,423 | 12/1993 | Brown et al. | 528/15 |
| 5,314,929 | 5/1994 | Crivello et al. | 522/31 |
| 5,576,356 | 11/1996 | Leir et al. | 522/31 |
| 5,594,042 | 1/1997 | Glover et al. | 522/31 |
| 5,629,095 | 5/1997 | Bujanowski et al. | 428/447 |
| 5,650,453 | 7/1997 | Eckberg et al. | 522/31 |

FOREIGN PATENT DOCUMENTS

| | | |
|---|---|---|
| 0462389 | 5/1991 | European Pat. Off. . |
| 0562922 | 3/1993 | European Pat. Off. . |

*Primary Examiner*—Susan W. Berman
*Attorney, Agent, or Firm*—Timothy J. Troy

[57] ABSTRACT

This invention relates to a radiation curable silicone compositions. More particularly this invention relates to radiation curable silicone compositions comprising a vinyl ether functional silicon compound, a cationic photoinitiator, a free radical photoinitiator, and dodecylphenol. The compositions of this invention can further comprise a vinyl ether compound which is free of silicon atoms. The radiation curable silicone compositions of this invention are useful as release coating compositions which are especially suitable for release of pressure sensitive adhesives.

20 Claims, No Drawings

RADIATION CURABLE SILICONE COMPOSITIONS

FIELD OF THE INVENTION

This invention relates to a radiation curable silicone compositions. More particularly this invention relates to radiation curable silicone compositions comprising a vinyl ether functional silicon compound, a cationic photoinitiator, a free radical photoinitiator, and dodecylphenol. The compositions of this invention can further comprise a vinyl ether compound which is free of silicon atoms. The radiation curable silicone compositions of this invention are useful as release coating compositions which are especially suitable for release of pressure sensitive adhesives.

BACKGROUND OF THE INVENTION

The curing rate of radiation curable silicone compositions for coating applications or adhesive applications is a very important factor in determining the effectiveness of the composition. The problem with free radical curing systems is their inhibition in the presence of oxygen and thus these systems require costly inert gas facilities to ensure a satisfactory cure rate. On the other hand, cationic curing systems have no oxygen inhibition problems but have the problem of moisture sensitivity.

Efforts to overcome these problems have been disclosed in the art. Furthermore, radiation curable compositions which contain vinyl ether functional organosilicon compounds have also been described in the art. For example, Crivello in U.S. Pat. No. 4,617,238 discloses a photopolymerizable composition comprising (a) an organopolysiloxane having at least one Si-bonded vinyloxy functional group of the formula $H_2C=CH-O-G-$, where G is alkylene (such as propylene) or alkylene interrupted by at least one divalent heteroradical selected from $-O-$, divalent phenylene, or substituted divalent phenylene, or combination of such heteroradicals, and (b) an onium salt catalyst. The '238 patent also describes a method wherein the vinyl ether group is introduced into the organopolysiloxane by addition (hydrosilylation) of compounds with an allyl and a vinyl ether group to an SiH group of the organopolysiloxane in the presence of a platinum catalyst. In the method of the '238 patent, only the allyl group is added to the SiH group while the vinyl ether group is preserved and thus only one vinyl ether group for each SiH group can be incorporated into the siloxane molecule at any given time.

European Patent Publication No. 0462389 teaches thermosetting organopolysiloxanes with oxyalkylene vinyl ether groups bonded by SiOC groups and the vinyl groups may be substituted by alkyl radicals. EPO'389 also teaches a method for the preparation of these compounds and their application as photochemically thermosetting polysiloxanes in encapsulating compounds, as non-stick coating compounds for flat carriers or as modified additives in compounds which can be thermoset radically, cationically or by UV or electron radiation.

Brown et al., in U.S. Pat. No. 5,270,423 discloses organosilicon compounds with a siloxane portion of the general formula $-OR'OCH=CHR''$ linked via an SiOC bond wherein R' is a divalent hydrocarbon radical and R" is hydrogen or an alkyl radical which are useful in radiation curable compositions, in which they are mixed with an initiator. The compositions are particularly useful in UV radiation curable coatings.

Glover et al. in U.S. Pat. No. 5,594,042 discloses radiation curable compositions comprising vinyl ether functional siloxanes and aromatic iodonium salt or aromatic sulfonium salt photoinitiators which cure upon exposure to ultraviolet or electron beam radiation. The vinyl ether groups are linked to the silicon atom on the siloxane through an SiOC bond and the photoinitiators are disclosed as being preferably either diaryliodonium salts of sulfonic acids or triarylsulfonium salts of sulfonic acids.

Bujanowski et al. in U.S. Pat. No. 5,629,095 discloses vinyl ether functional siloxane resins, radiation curable coating compositions comprising a vinyl ether functional siloxane resin and a photocleavable acid, and a coated article obtained by applying the radiation curable coating composition to a substrate and then exposing the coating to radiation in an amount sufficient to cure the coating. In the '095 patent, the vinyl ether group in the siloxane resin is attached to the silicone atom through an SiOC bond.

In contrast to the above described compositions, the radiation curable silicone compositions of this invention have a good curing rate in moist air without requiring the protection afforded by an inert gas facility.

SUMMARY OF THE INVENTION

This invention relates to radiation curable silicone compositions comprising a vinyl ether functional silicon compound, a cationic photoinitiator, a free radical photoinitiator, and dodecylphenol. The radiation curable silicone compositions of this invention can further comprise a vinyl ether compound which is free of silicon atoms.

It is an object of this invention to produce radiation curable silicone compositions which are useful as release coating compositions.

It is an object of this invention to produce radiation curable silicone compositions which are suitable for release of pressure sensitive adhesives.

It is an object of this invention to produce radiation curable silicone compositions which have a good curing rate in moist air and do not require the protection afforded by an inert gas facility.

DETAILED DESCRIPTION OF THE INVENTION

This invention relates to a radiation curable silicone composition comprising: (A) a vinyl ether functional silicon compound; (B) a cationic photoinitiator, (C) a free radical photoinitiator, and (D) dodecylphenol.

By vinyl ether functional silicon compound as used herein is meant any compound which contains at least one silicon atom bonded to at least one vinyl ether group having its formula selected from the group consisting of $-R^2OCH=CH_2$ and $-OR^2OCH=CH_2$ wherein $R^2$ is a divalent hydrocarbon radical having from 2 to 20 carbon atoms. Preferably component (A) is a vinyl ether functional organopolysiloxane compound having its formula selected from the group consisting of:

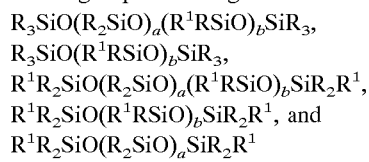

wherein each R is a monovalent hydrocarbon radical having from 1 to 20 carbon atoms, $R^1$ is a vinyl ether group having its formula selected from the group consisting of (i) $-R^2OCH=CH_2$, (ii) 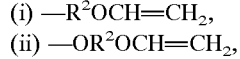

(iii) —R$^2$Si(R$^2$OCH=CH$_2$)$_{3-c}$R$_c$, and (iv) —R$^2$Si(OR$^2$OCH=CH$_2$)$_{3-c}$R$_c$ wherein R$^2$ is independently a divalent hydrocarbon radical having from 2 to 20 carbon atoms, c has a value of 0 to 2, R is as defined above, a has a value of 1 to 5000, b has a value of 1 to 800.

In the formula for component (A) above, each R denotes a monovalent hydrocarbon radical having from 1 to 20 carbon atoms. The monovalent hydrocarbon radicals are exemplified by alkyl radicals such as methyl, ethyl, propyl, butyl, hexyl, octyl, and decyl, cycloaliphatic radicals such as cyclohexyl, aryl radicals such as phenyl, tolyl, and xylyl, aralkyl radicals such as benzyl and phenylethyl, and olefinic hydrocarbon radicals such as vinyl, allyl, methallyl, butenyl, and hexenyl, octenyl, cyclohexenyl and styryl. Alkenyl radicals are preferably terminally unsaturated. It is highly preferred that R is methyl. The monovalent hydrocarbon radical can also be any monovalent hydrocarbon radical noted above which has at least one of its hydrogen atoms replaced with a halogen, such as fluorine, chlorine, or bromine, and these monovalent hydrocarbon radicals are exemplified by CF$_3$CH$_2$CH$_2$— and C$_4$F$_9$CH$_2$CH$_2$—. Each R radical can be the same or different, as desired.

Divalent hydrocarbon radicals suitable as R$^2$ are exemplified by alkylene radicals such as ethylene, propylene, butylene, pentylene, trimethylene, 2-methyltrimethylene, pentamethylene, hexamethylene, 3-ethyl-hexamethylene, octamethylene, —CH$_2$(CH$_3$)CH—, —CH$_2$CH(CH$_3$)CH$_2$—, —(CH$_2$)$_{18}$—, and cycloalkylene radicals such as cyclohexylene, arylene radicals such as phenylene, combinations of divalent hydrocarbon radicals such as benzylene. Examples of suitable divalent halohydrocarbon radicals also include any divalent hydrocarbon radical wherein one or more hydrogen atoms have been replaced by halogen, such as fluorine, chlorine or bromine exemplified by CH$_2$CH$_2$CF$_2$CF$_2$CH$_2$CH$_2$—. Each R$^2$ can be the same or different as desired. Preferably each R$^2$ is selected from the group consisting of ethylene and butylene. It is especially preferred that R$^1$ is a group having the formula —(CH$_2$)$_2$Si(O(CH$_2$)$_4$OCH=CH$_2$)$_3$.

In the above formula for (A), it is preferred that c have a value of zero, a has a value of 10 to 200, and b has a value of 1 to 80.

It is preferred for purposes of this invention that from 20 to 99 weight percent (wt %) of the vinyl ether functional organopolysiloxane compound described above be used, and it is highly preferred that from 85 to 90 wt % of this compound be employed, said wt % being based on the total weight of the radiation curable silicone composition.

Component (B) in the composition of this invention is cationic photoinitiator. Suitable cationic photoinitiators are selected from the group consisting of onium salts, diaryliodonium salts of sulfonic acids, triarylsulfonium salts of sulfonic acids, diaryliodonium salts of boronic acids, and triarylsulfonium salts of boronic acids.

The onium salts are preferably selected from the group consisting of R$^3_2$I$^+$MX$_n^-$, R$^3_3$S$^+$MX$_n^-$, R$^3_3$Se$^+$MX$_n^-$, R$^3_4$P$^+$MX$_n^-$, and R$^3_4$N$^+$MX$_n^-$, wherein each R$^3$ is an organic radical having from 1 to 30 carbon atoms exemplified by aromatic carbocyclic radicals having from 6 to 20 carbon atoms. Each R$^3$ can be substituted with from 1 to 4 monovalent hydrocarbon radicals exemplified by alkoxy radicals having from 1 to 8 carbon atoms, alkyl radicals having from 1 to 8 carbon atoms, nitro, chloro, bromo, cyano, carboxyl, mercapto, and aromatic heterocyclic radicals exemplified by pyridyl, thiophenyl, and pyranyl. The symbol M in the formulae hereinabove are metals or metalloids which include transition metals exemplified by Sb, Fe, Sn, Bi, Al, Ga, In, Ti, Zr, Sc, V, Cr, Mn, Cs, rare earth metals exemplified by lanthanides, for example, Cd, Pr, and Nd, and metalloids exemplified by B, P, and As. MX$_n^-$ is a non-basic, non-nucleophilic anion exemplified by BF$_4^-$, PF$_6^-$, AsF$_6^-$, SbF$_6^-$, SbCl$_6^-$, HSO$_4^-$, ClO$_4^-$, FeCl$_4^=$, SnCl$_6^=$, and BiCl$_5^=$.

Preferred onium salts are exemplified by bis-diaryl iodonium salts, for example, bis(dodecyl phenyl)iodonium hexafluoroarsenate, bis(dodecylphenyl)iodonium hexafluoroantimonate, and dialkylphenyl iodonium hexafluoroantimonate.

Diaryliodonium salts of sulfonic acids, triarylsulfonium salts of sulfonic acids, diaryliodonium salts of boronic acids, and triarylsulfonium salts of boronic acids are also suitable as the cationic photoinitiator(B). Preferred diaryliodonium salts of sulfonic acid are diaryliodonium salts of perfluoroalkylsulfonic acids and diaryliodonium salts of aryl sulfonic acids. Preferred diaryliodonium salts of perfluoroalkylsulfonic acids are exemplified by diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethane sulfonic acid. Preferred diaryliodonium salts of aryl sulfonic acids are exemplified by diaryliodonium salts of para-toluene sulfonic acid, diaryliodonium salts of dodecylbenzene sulfonic acid, diaryliodonium salts of benzene sulfonic acid, and diaryliodonium salts of 3-nitrobenzene sulfonic acid.

Preferred triarylsulfonium salts of sulfonic acid are triarylsulfonium salts of perfluoroalkylsulfonic acids and triarylsulfonium salts of aryl sulfonic acids. Preferred triarylsulfonium salts of perfluoroalkylsulfonic acids are exemplified by triarylsulfonium salts of perfluorobutanesulfonic acid, triarylsulfonium salts of perfluoroethanesulfonic acid, triarylsulfonium salts of perfluoro-octanesulfonic acid, and triarylsulfonium salts of trifluoromethane sulfonic acid. Preferred triarylsulfonium salts of aryl sulfonic acids are exemplified by triarylsulfonium salts of para-toluene sulfonic acid, triarylsulfonium salts of dodecylbenzene sulfonic acid, triarylsulfonium salts of benzene sulfonic acid, and triarylsulfonium salts of 3-nitrobenzene sulfonic acid.

Preferred diaryliodonium salts of boronic acids, and triarylsulfonium salts of boronic acids are compounds such as those disclosed in European Patent Application No. 0562922. Preferred diaryliodonium salts of boronic acids include diaryliodonium salts of perhaloarylboronic acids and preferred triarylsulfonium salts of boronic acids are the triarylsulfonium salts of perhaloarylboronic acid.

Preferably the amount of cationic photoinitiator (B) is from 0.1 to 5 wt % based on the total weight of the composition, and it is highly preferred to use from 1 to 3 wt % based on the total weight of the radiation curable silicone composition.

Component (C) in the composition of this invention is a free radical photoinitiator. The free radical photoinitiators of this invention can be any benzoins exemplified by benzoin alkyl ethers, acetophenones exemplified by dialkoxyacetophenones, dichloroacetophenones, and trichloroacetophenones, benzils exemplfied by benzil ketals, quinones, and O-acylated -α-oximinoketones. Preferably the free radical photoinitiator is a compound having the formula

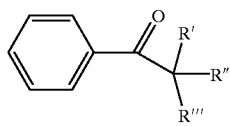

wherein R' is selected from the group consisting of —H, an alkoxy group, and a halogen atom, R" is selected from the group consisting of —OH, an alkoxy group, and a halogen atom, and R''' is selected from the group consisting of —H, an alkyl group, and a halogen atom. Preferred embodiments of this compound are (i) where R' is —H, R" is —OH and R''' is methyl or phenyl, (ii) where R' is —H, R" is an alkoxy group and R''' is phenyl (for benzoin alkyl ethers), (iii) where both R' and R" are alkoxy groups and R''' is phenyl (for benzil ketals), (iv) where both R' and R" are alkoxy groups and R''' is —H (for dialkoxyacetophenones), and (v) where both R' and R" are —Cl and R''' is —Cl or —H (for di- and tri- chloroacetophenones). It is especially preferred for the compositions that component (C) is Darocure® 1173 (2-hydroxy-2-methyl-1-phenyl-propan-1-one).

Preferably the amount of free radical photoinitiator (C) is from 0.5 to 5 wt % based on the total weight of the composition, and it is highly preferred to use from 1 to 3 wt % based on the total weight of the radiation curable silicone composition.

Component (D) in the composition of this invention is dodecylphenol. For the purposes of this invention, "dodecylphenol" denotes a compound having the formula $C_{12}H_{25}C_6H_4OH$ or a mixture comprising isomers of a compound having the formula $C_{12}H_{25}C_6H_4OH$.

Preferably the amount of dodecylphenol (D) is from 0.5 to 10 wt % based on the total weight of the composition, and it is highly preferred to use from 1 to 5 wt % based on the total weight of the radiation curable silicone composition.

The composition of this invention can further comprise (E) a vinyl ether compound which is free of silicon atoms. Component (E) is exemplified by ethyl vinyl ether, propyl vinyl ether, butyl vinyl ether, isobutyl vinyl ether, dodecyl vinyl ether, octadecyl vinyl ether, ethylene glycol monovinyl ether, diethylene glycol divinyl ether, butanediol monovinyl ether, butanediol divinyl ether, hexanediol divinyl ether, ethylene glycol butyl vinyl ether, triethylene glycol methyl vinyl ether, cyclohexanedimethanol divinyl ether, 2-ethylhexyl vinyl ether, poly-THF-divinyl ether 290, Pluriol-E-200-divinyl ether, cyclohexyl vinyl ether, tert-butyl vinyl ether, tert-amyl vinyl ether, ethylene glycol divinyl ether, diethylene glycol monovinyl ether, hexanediol monovinyl ether, tetraethylene glycol divinyl ether, trimethylol propane trivinyl ether, aminopropyl vinyl ether, and 2-diethylaminoethyl vinyl ether.

Preferably, component (E) is a vinyl ether compound having the formula $(CH_2=CHOR^4)_d CR^5_{4-d}$ wherein $R^4$ is a divalent hydrocarbon radical having from 1 to 20 carbon atoms, $R^5$ is hydrogen or a monovalent hydrocarbon radical having from 1 to 20 carbon atoms, and d has a value of 1 to 3. The monovalent and divalent hydrocarbon radicals are as delineated above for the vinyl ether functional organopolysiloxane, including preferred embodiments thereof. Preferably $R^4$ is an alkylene group having the formula —$(CH_2)_y$— wherein y has a value of 1 to 20, d has a value of 1, and $R^5$ is hydrogen. It is highly preferred that component (E) is a compound having the formula $CH_2=CHO(CH_2)_{11}CH_3$ (dodecyl vinyl ether).

Preferably the amount of vinyl ether compound (E) is from 1 to 20 parts by weight, and it is highly preferred to use from 1 to 5 parts by weight per 100 parts by weight of the radiation curable silicone composition.

The compositions of this invention can further comprise a vinyl ether functional siloxane resin. Preferably the vinyl ether functional siloxane resin is a compound having the formula:

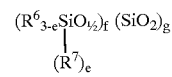

wherein $R^6$ is independently selected from the group consisting of alkyl groups having from 1 to 20 carbon atoms and alkoxy groups having from 1 to 8 carbon atoms, $R^7$ is a vinyl ether group having its formula selected from the group consisting of $$—R^8OCH=CH_2 \quad (i)$$

and $$—OR^8OCH=CH_2 \quad (ii)$$

wherein $R^8$ is a divalent hydrocarbon radical having from 2 to 20 carbon atoms, e has a value from 1 to 3, f is a mole percent of from greater than 0 to less than 100, and g is a mole percent of from greater than zero to less than 100, with the proviso that the sum of f+g is equal to 100 mole percent, and with the proviso that there is at least one vinyl ether group selected from the group consisting of —$R^8OCH=CH_2$ and —$OR^8OCH=CH_2$ per molecule. The alkyl groups of $R^6$ are as defined above, with methyl being preferred. The alkoxy groups of $R^6$ are exemplified by methoxy, ethoxy, propoxy, butoxy, and pentoxy, with methoxy being preferred. The divalent hydrocarbon radicals of $R^7$ are as defined above with butylene being preferred. It is preferred for purposes of this invention that e has a value of 1 or 2. Preferred vinyl ether functional siloxane resins are disclosed in U.S. Pat. No. 5,629,095, incorporated hereinby reference to teach vinyl ether functional siloxane resins which are useful as release modifiers in the compositions of this invention.

Preferably the amount of release modifier is from 10 to 80 parts by weight, and it is highly preferred to use from 20 to 50 parts by weight per 100 parts by weight of the radiation curable silicone composition.

The radiation curable silicone compositions of this invention can also contain ingredients exemplified by reinforcing and extending fillers, hydrocarbons and halohydrocarbons, colorants, dyes, preservatives, fragrances, stabilizers, adhesion modifiers, or diluents.

The radiation curable silicone compositions of this invention can be prepared by mixing the materials described hereinabove and any optional components in any order, using any suitable mixing means, such as a spatula, a drum roller, a mechanical stirrer, a three-roll mill, a sigma blade mixer, a bread dough mixer, or a two-roll mill.

This invention further relates to a method of making a radiation curable silicone composition comprising (I) mixing components (A)–(D) described hereinabove. The method can further comprise adding (E) a vinyl ether compound which is free of silicon atoms, and any of the optional ingredients recited above during step (I). Components (A)–(D), (E), and the other optional ingredients are as described above, including preferred embodiments and amounts thereof.

The present invention further relates to a method of making an article of manufacture comprising (I) applying a radiation curable composition comprising components (A)–(D) described hereinabove, to a solid substrate to form a coating, and (II) exposing the coating to an energy source selected from the group consisting of (i) actinic radiation and (ii) actinic radiation in combination with heat in an amount sufficient to cure the coating.

The composition of (I) can further comprise (E) a vinyl ether compound which is free of silicon atoms, and any of the optional ingredients recited above. Components (A)–(E) and the optional ingredients are as described above, including preferred embodiments and amounts thereof.

The coating may be applied by any suitable manner known in the art, such as by spreading, brushing, extruding, spraying, gravure, kiss-roll and air-knife.

In a preferred embodiment, the solid substrate is a flexible sheet material such as paper, polyolefin film, polyolefin-coated paper, or foil. Other suitable solid substrates that can be coated by the method of this invention include other cellulosic materials such as wood, cardboard and cotton; metallic materials such as aluminum, copper, steel and silver; siliceous materials such as glass and stone; and synthetic polymer materials such as polyolefins, polyamides, polyesters and polyacrylates. As to form, the solid substrate can be substantially sheet-like, such as a peelable release liner for pressure sensitive adhesive; a fabric or a foil; or substantially three-dimensional in form.

By actinic radiation it is meant ultraviolet light; electron beam radiation; or alpha-, beta-, gamma- or x-rays. By heat it is meant infrared radiation, hot-air, microwave radiation, etc. Of course actinic radiation is frequently accompanied by heat and the use of a combination of the two falls within the scope and spirit of the present invention. Herein the term "cure", as applied to the composition and method of this invention, generally denotes a chemical change which leads to a change in the state of the composition from a liquid to a solid. Curing itself may be achieved in any of the known ways, including passing a coated substrate under the desired source of radiation, for example a UV lamp, at a predetermined rate and exposing a completely coated substrate to radiation by switching on the required energy source for a predetermined time.

In a preferred embodiment, a flexible sheet material, such as paper, metal foil or tapestock, is coated with a thin coating of the radiation curable silicone composition, preferably in a continuous manner, and the thus-coated material is then heated and/or irradiated to rapidly cure the coating, to provide a sheetlike material bearing on at least one surface thereof an adhesive-releasing coating. The adhesive-releasing coating is subsequently brought into contact with an adhesive, preferably in an in-line manner, to form an article having a peelable, i.e. releasable, adhesive/coating interface. Examples of such an article include, adhesive labels having a peelable backing, adhesive tape in roll form and adhesive packaged in a strippable container. The adhesive can be a non-silicone- based pressure sensitive adhesive such as the well-known acrylic or rubber types or a silicone-based pressure sensitive adhesive such as the peroxide- or platinum-curable polydiorganosiloxane-based adhesives. The adhesive can also be those used in foods, asphalt, and gum polymers. The compositions of the present invention are useful as release coatings for pressure sensitive adhesives, as protective coatings and decorative coatings.

In the examples hereinbelow, all amounts (parts and percentages) are by weight unless otherwise indicated. Cure time for a composition means the time interval required for the composition, when coated onto S2S Kraft paper or polypropylene film, at a thickness of 0.7 g of silicone per square meter of paper or film, to attain the no smear, no migration, no rub-off condition. Viscosity was measured in millipascal-seconds (1 millipascal-second=1 centipoise).

EXAMPLES

Example 1

To a suitable container, 0.2 grams (g) of a 60/40 weight to weight mixture of tolyl (dodecylphenyl)iodonium trifluoromethanesulfonate diluted in dodecylphenol (hereinafter denoted "triflate catalyst"), and 9.8 g of a vinyl ether functional organopolysiloxane containing approximately 17 wt % vinyl ether and having the formula $R(CH_3)_2SiO((CH_3)_2SiO)_x(RCH_3SiO)_ySi(CH_3)_2R$ wherein R denotes $—(CH_2)_2Si(O(CH_2)_4OCH=CH_2)_3$ and having a viscosity of about 1200 mPa.s (millipascal-seconds) at 25° C., referred to hereinafter as the "vinyl ether siloxane" (VES), were mixed thoroughly with a spatula. Approximately 1.1 milligrams was transferred to an aluminum differential scanning calorimeter pan. The pan was placed into a TA differential scanning photocalorimeter (DPC) equipped with a high intensity mercury arc lamp and irradiated at an intensity of 35 mW/cm$^2$. The experiment was carried out under a constant flow of inert gas. This condition is hereinafter denoted "dry condition". Reaction rate as measured by rate of heat evolved (i.e. slope of the exothermic peak) was 152.7 watts/gram/minute and the extent of cure as measured by the peak maximum was 7.1 watts/gram. Higher values represent faster cure rates and a higher extent of cure.

Example 2

The same procedure was followed as in Example 1, except air was bubbled through water at room temperature prior to entry into the DPC chamber. The experiment carried out under these conditions is hereinafter denoted "wet condition". Slope was 11.2 w/g/min and a peak maximum of 1.7 w/g. The cure rate and extent of cure decreased by a factor of 14 and 4, respectively. This example demonstrates the severe adverse effect of air moisture on the cure for the composition described in Examples 1 and 2.

Examples 3–6

To examine the effect of dodecylphenol on cure rate under wet conditions, the following compositions were prepared in the weight (grams) described in Table 1 below. Triflate catalyst and dodecylphenol were added to a suitable container and mixed with a spatula. The vinyl ether siloxane was added to the container and mixed thoroughly with a spatula. Cure rates were measured as described in Example 1 under wet conditions. The slope and peak maximum are recorded in Table 1 below.

TABLE 1

| Example | VES | Triflate | Dodecylphenol | Slope (w/g/min) | Peak (w/g) |
|---|---|---|---|---|---|
| 3 | 9.75 | 0.2 | 0.05 | 9.9 | 1.3 |
| 4 | 9.7 | 0.2 | 0.1 | 16.3 | 1.4 |
| 5 | 9.51 | 0.2 | 0.29 | 109.1 | 8.2 |
| 6 | 9.21 | 0.2 | 0.59 | 121.4 | 9.3 |

Examples 7–9

The following examples show the unexpected dramatic synergistic effect of adding a free radical in the presence and absence of a cationic photoinitiator. The following compositions were prepared in the weight (grams) listed in Table 2 below. The vinyl ether siloxane and triflate catalyst were added to a suitable container and mixed thoroughly. Darocure® 1173 (2-hydroxy-2-methyl-1-phenyl-propan-1-one from Ciba Geigy, Terrytown, N.Y.), a free radical photoinitiator, was added and mixed thoroughly. Cure rates were determined in both wet and dry conditions. The slope and peak maximum are recorded in Table 2 below. The data from Example 2 was provided for comparison purposes.

TABLE 2

| Example | VES | Triflate | Darocure 1173 | Atmosphere | Slope (w/g/min) | Peak (w/g) |
|---|---|---|---|---|---|---|
| 7 | 9.9 |  | 0.1 | Dry | 26.9 | 1.9 |
| 8 | 9.8 | 0.1 | 0.1 | Dry | 357.6 | 15.8 |
| 9 | 9.8 | 0.1 | 0.1 | wet | 176.7 | 7.2 |
| 2 | 9.8 | 0.2 | 0 | wet | 11.2 | 1.7 |

Examples 10–11

The following examples illustrates the use of a vinyl ether which is free of silicon atoms as a diluent. The following compositions listed in Table 3 below were prepared as described in Examples 7–9 above. Dodecyl vinyl ether was added last and mixed thoroughly with a spatula. Measurements were carried out as described in example 1 above in wet conditions. The slope and peak maximum are recorded in Table 3 below. The data from Example 9 was provided for comparison purposes.

TABLE 3

| Example | VES | Triflate | Darocure 1173 | Dodecyl vinyl Ether | Slope (w/g/min) | Peak (w/g) |
|---|---|---|---|---|---|---|
| 10 | 9.8 | 0.1 | 0.1 | 0.5 | 234.7 | 12 |
| 11 | 9.8 | 0.1 | 0.1 | 1 | 349.7 | 15.2 |
| 9 | 9.8 | 0.1 | 0.1 | 0 | 176.7 | 7.2 |

Example 12

The following example illustrates the effect of dodecylphenol, Darocure® 1173, triflate catalyst, and dodecyl vinyl ether in combination have on cure rates. Ingredient weight (grams) and the results are listed in Table 4 below. Dodecylphenol and triflate catalyst were added to a suitable container and mixed well. The vinyl ether siloxane was added and mixed thoroughly. Dodecyl vinyl ether was added and mixed thoroughly. Darocure® 1173 was added and mixed thoroughly. Measurements were carried as described in Example 1 above in wet conditions. The slope and peak maximum are recorded in Table 4 below.

TABLE 4

| Example | VES | Triflate | Dodecylphenol | Darocure 1173 | Dodecyl vinyl ether | Atmosphere | Slope (w/g/min) | Peak (w/g) |
|---|---|---|---|---|---|---|---|---|
| 12 | 9.7 | 0.2 | 0.5 | 0.1 | 0.5 | wet | 424.8 | 16.5 |

Example 13

0.20 g of the triflate catalyst was added to 9.8 g of vinyl ether siloxane and mixed thoroughly. The coating was coated on 2 mil thick biaxially oriented polypropylene at a coating weight of approximately 0.7 gms/m². Cure was carried out on a Fusion UV processor equipped with an H-Bulb with an irradiating power of 300 watts/in². The relative humidity was measured to be 67%. The coating cured at a line speed of 39 ft/min. Cure was determined as the speed to no migration of silicone to a rubber based test tape.

Example 14

The coating from example 13 was exposed to an H-bulb with an irradiating power of 600 watts/in². The cure rate was determined to be 183 ft/min.

Example 14

0.2 (g) of triflate catalyst and 0.5 g of dodecylphenol were added to a suitable container and mixed thoroughly. 9.8 g of vinyl ether siloxane was added and mixed thoroughly. Coating thickness and UV processor were the same as described in Example 13. The coating was cured by exposing to an H-bulb with an irradiating power of 300 watts/in². The coating cured at a line speed of 152 ft/min.

Example 16

1.0 g of Darocure® 1173 was added to the coating in example 15 and mixed thoroughly. Coating thickness and UV processor were the same as described in Example 13. The coating was cured by exposing to a H-bulb with an irradiating power of 300 watts/in². The coating cured at a line speed of 316 ft/min.

Example 17

5.0 g of dodecyl vinyl ether was added to the coating in example 16 and mixed thoroughly. Coating thickness and UV processor were the same as described in Example 13. The coating was cured by exposing to a H-bulb with an irradiating power of 300 watts/in². The coating cured at a line speed of >512 ft/min which is the maximum line speed of the UV processor.

Examples 18–22

In the following examples, the compositions listed in Table 5 below were each coated onto biaxially oriented polypropylene and cured by exposure to a Fusion UV Processor equipped with an H-bulb with an irradiating power of 600 watts/in². In Table 5, the ingredients are listed in terms of their weight in grams. Cure was measured by the absence of silicone migration to a rubber based test tape after exposure to the coated liner. The coated films were aged at room temperature for 1 day, then laminated with an acrylic based tape, Tesa® 7475. The laminates were aged at room temperature for the time indicated prior to determining the release force. Release forces were measured at various peel speeds at a 180° peel angle. Results are listed in Tables 6–8 below. The data in Table 6 demonstrates the superior performance of the coating composition of this invention. The release forces are lower and more stable for the compositions of this invention (Examples 19–22) than the control (Example 18).

Comparison of the data shown in Column 2 of Tables 6, 7, and 8 show that the coating compositions of this invention provide increased peel forces with an increase in peel speed. This unique characteristic is important in some applications. The control coating (Example 18) does not have this unique characteristic.

TABLE 5

| Example | VES | Triflate | Dodecylphenol | Darocure 1173 | Dodecyl Vinyl Ether |
|---|---|---|---|---|---|
| 18 | 9.8 | 0.2 | 0 | 0 | 0 |
| 19 | 9.6 | 0.2 | 0.1 | 0.1 | 0 |
| 20 | 9.4 | 0.2 | 0.3 | 0.1 | 0 |
| 21 | 9.2 | 0.2 | 0.5 | 0.1 | 0 |
| 22 | 8.7 | 0.2 | 0.5 | 0.1 | 0.5 |

TABLE 6

Release performance (gms/in)

Peelspeed = 2.54 m/m in Laminate Age (days)

| Example | 1 | 14 | 28 |
|---|---|---|---|
| 18 | 35.7 | 109.3 | 208 |
| 19 | 11.75 | 12.2 | 14.5 |
| 20 | 11.4 | 14.6 | 15.1 |
| 21 | 12.6 | 18.1 | 14.1 |
| 22 | 11.2 | 13.3 | 23.6 |

TABLE 7

Peelspeed = 10.16 m/m in Laminate Age (days)

| Example | 1 | 14 | 28 |
|---|---|---|---|
| 18 | 37.65 | 93.1 | 210.3 |
| 19 | 15.2 | 14.9 | 20.1 |
| 20 | 15.7 | 16 | 17.4 |
| 21 | 16.1 | 39.5 | 31.9 |
| 22 | 14.8 | 14.7 | 23.1 |

TABLE 8

Peelspeed = 10.16 m/m in Laminate Age (days)

| Example | 1 | 14 | 28 |
|---|---|---|---|
| 18 | 35.25 | 65.2 | 175.5 |
| 19 | 25.9 | 37.1 | 26.2 |
| 20 | 29.15 | 27.7 | 32 |
| 21 | 25.25 | 32 | 28.8 |
| 22 | 23.4 | 17.2 | 18.3 |

That which is claimed is:

1. A radiation curable silicone composition comprising:
    (A) a vinyl ether functional silicon compound;
    (B) a cationic photoinitiator;
    (C) a free radical photoinitiator; and
    (D) dodecylphenol.

2. A composition according to claim 1, wherein (A) is a vinyl ether functional organopolysiloxane compound having its formula selected from the group consisting of:
    $R_3SiO(R_2SiO)_a(R^1RSiO)_bSiR_3$,
    $R_3SiO(R^1RSiO)_bSiR_3$,
    $R^1R_2SiO(R_2SiO)_a(R^1RSiO)_bSiR_2R^1$,
    $R^1R_2SiO(R^1RSiO)_bSiR_2R^1$, and
    $R^1R_2SiO(R_2SiO)_aSiR_2R^1$ wherein each R is a monovalent hydrocarbon radical having from 1 to 20 carbon atoms, $R^1$ is a vinyl ether group having its formula selected from the group consisting of
    (i) $-R^2OCH=CH_2$,
    (ii) $-OR^2OCH=CH_2$,
    (iii) $-R^2Si(R^2OCH=CH_2)_{3-c}R_c$, and
    (iv) $-R^2Si(OR^2OCH=CH_2)_{3-c}R_c$ wherein $R^2$ is independently a divalent hydrocarbon radical having from 2 to 20 carbon atoms, c has a value of 0 to 2, R is as defined above, a has a value of 1 to 5000, b has a value of 1 to 800.

3. A composition according to claim 2, wherein R is methyl, $R^2$ is independently selected from the group consisting of ethylene and butylene.

4. A composition according to claim 2, wherein $R^1$ is a group having the formula $-(CH_2)_2Si(O(CH_2)_4OCH=CH_2)_3$.

5. A composition according to claim 2, wherein c has a value of zero, a has a value of 10 to 200, and b has a value of 1 to 80.

6. A composition according to claim 1, wherein (B) is selected from the group consisting of onium salts, diaryliodonium salts of sulfonic acids, triarylsulfonium salts of sulfonic acids, diaryliodonium salts of boronic acids, and triarylsulfonium salts of boronic acids.

7. A composition according to claim 1, wherein (B) is selected from the group consisting of bis(dodecyl phenyl) iodonium hexafluoroarsenate, bis(dodecylphenyl)iodonium hexafluoroantimonate, dialkylphenyl iodonium hexafluoroantimonate, diaryliodonium salts of perfluorobutanesulfonic acid, diaryliodonium salts of perfluoroethanesulfonic acid, diaryliodonium salts of perfluorooctanesulfonic acid, diaryliodonium salts of trifluoromethane sulfonic acid, diaryliodonium salts of para-toluene sulfonic acid, diaryliodonium salts of dodecylbenzene sulfonic acid, diaryliodonium salts of benzene sulfonic acid, diaryliodonium salts of 3-nitrobenzene sulfonic acid, triarylsulfonium salts of perfluorobutanesulfonic acid, triarylsulfonium salts of perfluoroethanesulfonic acid, triarylsulfonium salts of perfluoro-octanesulfonic acid, triarylsulfonium salts of trifluoromethane sulfonic acid, triarylsulfonium salts of para-toluene sulfonic acid, triarylsulfonium salts of dodecylbenzene sulfonic acid, triarylsulfonium salts of benzene sulfonic acid, triarylsulfonium salts of 3-nitrobenzene sulfonic acid, diaryliodonium salts of perhaloarylboronic acids, and triarylsulfonium salts of perhaloarylboronic acid.

8. A composition according to claim 1, wherein (B) is selected from the group consisting of diaryliodonium salts of trifluoromethane sulfonic acid and triarylsulfonium salts of trifluoromethane sulfonic acid.

9. A composition according to claim 1, wherein (C) is a compound having the formula

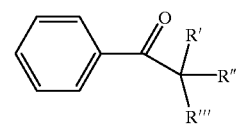

wherein R' is selected from the group consisting of —H, an alkoxy group, and a halogen atom, R" is selected from the group consisting of —OH, an alkoxy group, and a halogen atom, and R'" is selected from the group consisting of —H, an alkyl group, and a halogen atom.

10. A composition according to claim 1, wherein (C) is 2-hydroxy-2-methyl-1-phenyl-propan-1-one.

11. A composition according to claim 1, wherein the composition further comprises (E) a vinyl ether compound which is free of silicon atoms.

12. A composition according to claim 11, wherein (E) is a vinyl ether compound having the formula $(CH_2=CHOR^4)_d CR^5_{4-d}$ wherein $R^4$ is a divalent hydrocarbon radical having from 1 to 20 carbon atoms, $R^5$ is hydrogen or a monovalent hydrocarbon radical having from 1 to 20 carbon atoms, and d has a value of 1 to 3.

13. A composition according to claim 11, wherein (E) is a compound having the formula $CH_2=CHO(CH_2)_{11}CH_3$.

14. A composition according to claim 1, wherein the composition further comprises a vinyl ether functional siloxane resin having the formula

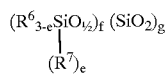

wherein $R^6$ is independently selected from the group consisting of alkyl groups having from 1 to 20 carbon atoms and alkoxy groups having from 1 to 8 carbon atoms, $R^7$ is a vinyl ether group having its formula selected from the group consisting of

      (i)

and

      (ii)

wherein $R^8$ is a divalent hydrocarbon radical having from 2 to 20 carbon atoms, e has a value from 1 to 3, f is a mole percent of from greater than 0 to less than 100, and g is a mole percent of from greater than zero to less than 100, with the proviso that the sum of f+g is equal to 100 mole percent, and with the proviso that there is at least one vinyl ether group selected from the group consisting of $—R^8OCH=CH_2$ and $—OR^8OCH=CH_2$ per molecule.

15. A composition according to claim 11, wherein the composition further comprises a vinyl ether functional siloxane resin having the formula

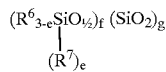

wherein $R^6$ is independently selected from the group consisting of alkyl groups having from 1 to 20 carbon atoms and alkoxy groups having from 1 to 8 carbon atoms, $R^7$ is a vinyl ether group having its formula selected from the group consisting of

      (i)

and

      (ii)

wherein $R^8$ is a divalent hydrocarbon radical having from 2 to 20 carbon atoms, e has a value from 1 to 3, f is a mole percent of from greater than 0 to less than 100, and g is a mole percent of from greater than zero to less than 100, with the proviso that the sum of f+g is equal to 100 mole percent, and with the proviso that there is at least one vinyl ether group selected from the group consisting of $—R^8OCH=CH_2$ and $—OR^8OCH=CH_2$ per molecule.

16. A method of making a radiation curable silicone composition comprising:

(I) mixing:
(A) a vinyl ether functional silicon compound;
(B) a cationic photoinitiator;
(C) a free radical photoinitiator; and
(D) dodecylphenol.

17. A method according to claim 16, wherein the method further comprises adding (E) a vinyl ether compound which is free of silicon atoms during step (I).

18. A method of making an article of manufacture comprising:

(I) applying a radiation curable silicone composition comprising:
(A) a vinyl ether functional silicon compound;
(B) a cationic photoinitiator;
(C) a free radical photoinitiator; and
(D) dodecylphenol to a solid substrate to form a coating; and (II) exposing the coating to an energy source selected from the group consisting of (i) actinic radiation and (ii) actinic radiation in combination with heat in an amount sufficient to cure the coating.

19. A method according to claim 18, wherein the composition of (I) further comprises (E) a vinyl ether compound which is free of silicon atoms.

20. An article of manufacture produced in accordance with the method of claim 18.

* * * * *